US005555221A

United States Patent [19]
Brochard et al.

[11] Patent Number: 5,555,221
[45] Date of Patent: Sep. 10, 1996

[54] DEVICE FOR PICKING UP SOUND WAVES PROPAGATING IN WATER

[75] Inventors: Claude Brochard, Viry Chatillon; Pierre Joanicot, Sceaux, both of France

[73] Assignee: Thomson-CSF, Paris, France

[21] Appl. No.: 84,025

[22] Filed: Oct. 4, 1979

[51] Int. Cl.⁶ ............................................. H04B 1/00
[52] U.S. Cl. .................... 367/154; 174/21 R; 367/153; 367/171; 367/172; 439/194; 439/201
[58] Field of Search ........................... 367/153, 154, 367/167, 172, 171, 166; 339/115, 117 R, 117 P; 174/21 R, 21 S, 21 C; 439/191, 192, 194, 195, 201

[56] References Cited

U.S. PATENT DOCUMENTS

| | | |
|---|---|---|
| 3,441,902 | 4/1968 | Savit . |
| 3,845,450 | 10/1974 | Cole ........................................... 339/42 |
| 3,893,063 | 7/1975 | Park ......................................... 367/154 |
| 3,980,369 | 9/1976 | Panek ........................................ 339/28 |
| 4,050,765 | 9/1977 | Duesterhoeft et al. ............. 339/117 R |
| 4,188,084 | 2/1980 | Buresi ................................. 339/117 R |
| 4,204,188 | 5/1980 | Weichart ................................. 367/154 |

*Primary Examiner*—Harold J. Tudor
*Attorney, Agent, or Firm*—Cushman Darby & Cushman, L.L.P.

[57] ABSTRACT

A chain of elongate components (10, 20) are connected end-to-end. Each component (e.g. 10) comprises a sheath (1) closed at its ends filled with a dielectric liquid (e.g. kerosene). Sound detectors are located in the liquid as are electric conductors for conveying signals therefrom. The ends are closed by means including an electric connector. At least one of a pair of mating end portions includes a valve (14, 24) which releases the dielectric liquid from inside the sheath into the interstices between the mated pair. A bleed screw can be used to ensure no air remains. This arrangement minimises pressure differentials around the join between two adjacent elongate components and facilitates use of the chain at great depths.

7 Claims, 2 Drawing Sheets

DEVICE FOR PICKING UP SOUND WAVES PROPAGATING IN WATER

The present invention relates to a device for picking up sound waves propagating in water.

A device for picking up sound waves propagating in water is known which includes a plurality of elongated components connected end to end to one another to constitute a chain submerged in sea water. The chain includes sensors which are capable of receiving sound waves propagating in water and of delivering in return electric signals transmitted to a set of conductors so as to convey them to one end of the chain to a unit where they are analysed. Each component therefore includes at least one sensor disposed inside a sheath whose ends are fixed to two end pieces provided with electric connector pins or sockets to which the conductors are connected. The inside space of the sheath is filled with a dielectric liquid in which the sensor and the conductors are immersed. To connect two components of the device together, a plug of one component is fitted into a socket of the other and the two corresponding end pieces are locked together e.g. by means of a coupling ring. The connection is sealed by means of an O ring which is capable of preventing water from coming between the facing surfaces of the coupled connectors.

The device described hereinabove has disadvantages if it is used at great depth. Indeed, firstly under the effect of water pressure, the seal for sealing the connection tends to leak; therefore, water seeps in between the electric connectors and this causes short-circuits.

Secondly, the coupling device must withstand high water pressure and must consequently be relatively heavy. This is also a disadvantage, since attempts are always made to lighten the device to obtain a density which is as near as possible to that of water, in order to reduce traction forces.

The present invention aims to mitigate these disadvantages.

It provides a device for picking up sound waves propagating in water, the device including at least a first component and a second component, each component including at least one acoustic sensor disposed inside a cylindrical sheath, electric conductors disposed in the sheath and connected to the sensor, two cylindrical end pieces connected coaxially to the two respective ends of the sheath in a sealed manner and a dielectric liquid disposed inside the sheath between the two end pieces, a first end piece of the first component including a first cylindrical electric connector fixed coaxially in the first end piece, the connector having a first plane outer surface and being in contact with the dielectric liquid of the first component which is on the side opposite to the first surface, the first connection including connector pins which protrude with respect to the first surface and which are connected, on the opposite side, to the conductors disposed in the sheath of the first component, a second end piece of the second component comprising a second cylindrical electric connector fixed coaxially in the second end piece, said connector having a second outer surface and being in contact with the dielectric liquid of the second component on the opposite side to the second surface, the second connector including sockets which lead out onto the second surface and are connected, on the opposite side, to the conductors disposed in the sheath of the second component, the device further including means for connecting the first component to the second component by inserting pins in the sockets and applying the first end piece against the second end piece, the means including at least one seal ring for preventing the water from reaching the space between the first surface and the second surface when the device is submerged, characterized in that it further includes at least a first valve fixed axially in the first connector and means for causing the first valve to open when the first end piece is in contact with the second end piece, so that part of the dielectric liquid inside the sheath of the first component can flow through the first valve into the space between the first surface and the second surface up to the seal ring, said part of the liquid then exerting on the seal ring a pressure which opposes that exerted on the seal ring by the water in which the device is submerged.

Particular embodiments of the present invention are described hereinbelow by way of example with reference to the accompanying drawings, in which.

A device in accordance with the invention and which is capable of picking up sound waves propagating in water is formed by a succession of elongated components connected end to end. The length of each component can be, for example, 50 meters. The device taken as a whole forms a chain whose length can reach several kilometers. The chain is submerged and can, for example, be towed from one of its ends by a boat.

Figure 1:
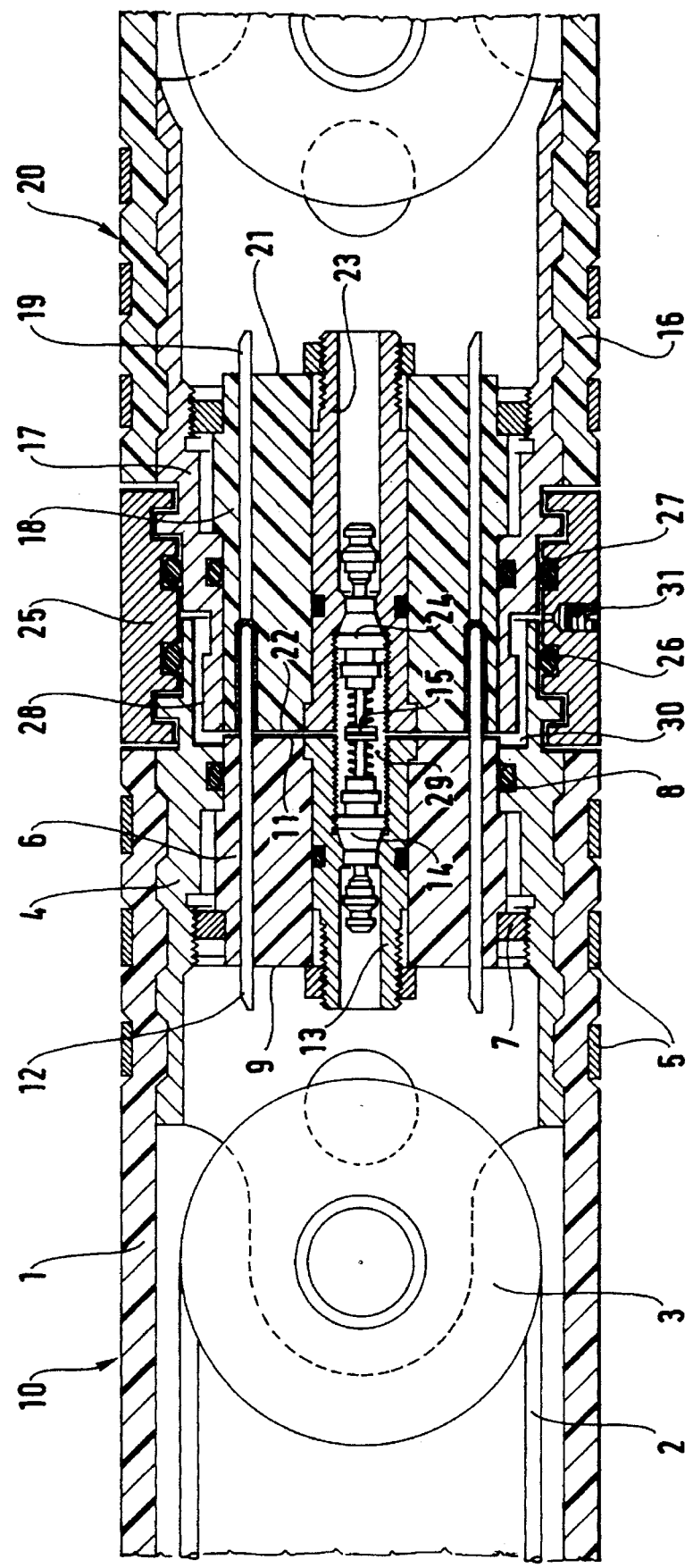
FIG. 1 illustrates a partial longitudinal cross-section of one embodiment of a device in accordance with the invention.

FIG. 1 shows, more particularly, a device for connecting two components 10 and 20. The general structure of the actual components is not described in detail hereinbelow, since the invention relates mainly to the connecting device.

Attention is simply drawn to the fact that each component, and in particular the component 10, one of whose ends is shown to the left of FIG. 1, includes a flexible sheath 1 closed at both its ends by two end pieces. One or several acoustic sensors, not shown in FIG. 1, are disposed inside the sheath. Electric conductors disposed inside the sheath are connected to each sensor. The conductors are also connected to electric connectors on the end pieces. Each component includes not only the conductors for transmitting the electric signals delivered by the sensors contained in the component, but also conductors which transmit the signals emitted by the sensors contained by the other components of the chain. All these conductors allow the signals emitted by the sensors of the chain to be transmitted to one of its ends, e.g. to the towing boat in which these signals are processed.

To prevent the relatively fragile sheath from being subjected to the tractive force due to towing, each component preferably includes a towing cable disposed inside its sheath, said cable connecting the two end pieces of the component together. FIG. 1 shows a towing cable 2 wound on a grooved pulley 3 rotatably mounted on a pin which is integral with the end piece which closes the visible end of the sheath 1.

The interior volume of the sheath is filled with a dielectric liquid in which the sensors, the electric conductors and the towing cable are immersed. The liquid, e.g. kerosene, is intended to reduce the density of the device with respect to the water in which it is submerged.

The end piece which contains the visible end of the sheath 1 includes a metal sleeve 4 whose outside diameter is smaller than that of the sheath 1 which is connected to the sleeve 4 in a sealed manner by means of collars such as 5 which nip the sheath 1 perpendicularly to annular grooves in the cylindrical outer wall of the sleeve 4. Inside the sleeve 4 a cylindrical electric connector 6 closes the interior volume of the sleeve and is fixed coaxially by means of a nut 7. An O ring 8 recessed in a groove inside the sleeve 4 provides sealing between the connector 6 and the sleeve 4. The connector 6 has a plurality of connecting pins such as 12 which extend through both of the plane surfaces 9 and 11 of the connector and protrude from the plane outer surface 11 of the connector.

The end of the pin 12 on the inner surface 9 side of the connector 6 is connected to a conductor (not shown in the figure) of the component 10. A metal tube 13 which also extends through the two surfaces 9 and 11 and the connector 6 is fixed in a sealed manner in the connector, along the axis thereof. A valve 14 which, when it is open, puts the dielectric liquid containing interior volume of the component 10 in communication with the outside is fixed in the interior of the tube 13. Preferentially, outside the component 10 the valve 14 includes a pin at its end 15, in the manner of valves currently used on motor car tires.

The component 20 partially shown to the right of FIG. 1 also includes a flexible sheath 16 connected to a sleeve 17. A cylindrical electric connector 18 closes the interior of the sleeve 17. The connector 18 includes a plurality of connecting sockets such as 19 which pass through the inner plane surface 21 of the connector 18 and lead out onto the plane outer surface 22 of the connector. A metal tube 23 which also passes through the two surfaces 21 and 22 is fixed in a sealed manner in the connector 18, along the axis thereof. A valve 24 which is identical to the valve 14 is fixed in a sealed manner in the connector 18, along the axis thereof; when the valve 24 is open, it puts the interior of the component 20 into communication with the outside, said interior, in the example illustrated in the figure, being filled with the same liquid as the component 10.

A connecting ring 25, of known type, mounted coaxially on the sleeve 4 can be disposed on the sleeve 17 between the sheaths 1 and 16. The diameter of the ring is equal to that of the sheaths 1 and 16 so that the connected components illustrated in FIG. 1 have a continuous outside cylindrical surface with a substantially constant diameter. O rings 26 and 27 are disposed between the ring 25 and sleeves 4 and 17 respectively.

To connect the components 10 and 20 together, their end pieces are brought close together so as to engage a rib formed on the sleeve 17 in a corresponding groove of the sleeve 4. The rib and the groove are referenced 28 in the figure and define a unique coupling position so as to guide the pins of the connector 6 into the sockets of the connector 18. A little before the pins enter the sockets completely, the ends 15 of the opening pins of the valves 14 and 24 come into contact with each other. When the sleeves 4 and 17 abut against each other, the valves 14 and 24 are open and part of the liquid which fills the interiors of the components 10 and 20 flows through these valves via their ends 15 which are in contact. Lastly, in a known manner, the two sleeves 4 and 17 are locked together by rotating the ring 25 through a fraction of a turn about the common axis of the device.

The liquid which flows through the ends 15 fills firstly the space between the valves inside the tubes 13 and 23, then seeps into the small space between the surfaces 11 and 22 of the respective connectors 6 and 18 before finally entering the space 30 between the connected sleeves 4 and 17 up to seals 26 and 27. A bleed screw 31 can be disposed in the sleeve 25 to remove air trapped by the seals 26 and 27 and enclosed in the spaces 29 and 30 and in the space between the surfaces 11 and 22 during the connecting operation.

The device described hereinabove and illustrated in FIG. 1 has the following advantages.

When the components are connected together and the device is submerged, due to its dielectric properties, the liquid which fills the space between the surfaces 11 and 22 in the components 10 and 20, provides good insulation between the pins of the connector 6 and the sockets of the connector 18. Further, the pressure exerted on the seals 26 and 27 by the liquid behind these seals opposes that which the water exerts on them when the device is submerged. These seals therefore withstand more easily the pressure of the water which surrounds the components and there are no leaks as there are in devices according to the prior art, in which the space between the adjacent surfaces of the connectors is filled with air. Lastly, it must be observed that the seal rings for sealing the components when they are disconnected, are in contact with the dielectric liquid on both sides after connection. Indeed, the seal ring 8, for example, is in contact on one side with the liquid which fills the component 10 and which seeps through the thread of the nut 7 between the connector 6 and the sleeve 4, and on the opposite side with the part of the liquid in the space between the surfaces 11 and 22 and in the space 30. The seals such as 8, which are subject to equal and opposing pressures, are therefore placed in optimum mechanical conditions.

It must also be observed that due to the valves, leakage of dielectric liquid is avoided after disconnection. The separated components are then properly sealed and can be handled independently from one another without taking special precautions.

Further, the fact that the outer surfaces of the two connected components are cylindrical and continuous, as seen in the figure, makes the towing of the submerged component easier because there is less friction in contact with the water.

Figure 2:
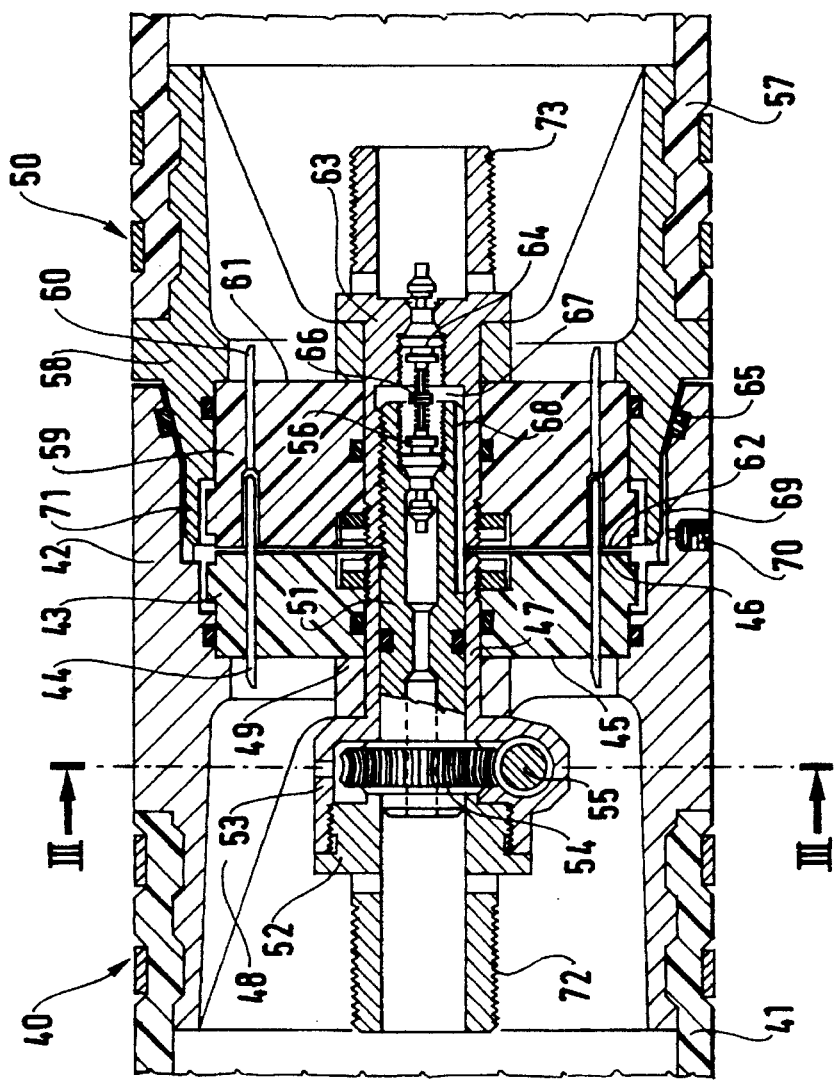
FIG. 2 illustrates a partial longitudinal cross-section of another embodiment of a device in accordance with the invention.

FIG. 2 illustrates a variant of the device in accordance with the invention. The variant in FIG. 2 is preferable when the diameter of the components is relatively great.

In FIG. 2, a component 40 includes a sheath 41 connected to a sleeve 42 whose outside diameter is equal to that of the sheath 41. A cylindrical connector 43 fitted with pins 44 is fixed inside the sleeve 41. The connector includes firstly a plane inside surface 45 in contact with a dielectric liquid contained in the component 40 and secondly a plane outside surface 46 parallel to the surface 45, the pins protruding from the surface 46. A sleeve 47 disposed coaxially inside the sleeve 42 is fixed on a sleeve 49 connected to the sleeve 42 by radial brackets such as 48. The sleeve 47 passes through the connector 43, from the surface 45 to the surface 46, perpendicularly to these surfaces. A screw 51 is disposed coaxially inside the sleeve 47. One of the ends of the screw 51 is fixed longitudinally by a stop 52 fixed by screwing into a casing 53 which extends the sleeve 47. The axial length of the screw is greater than the height of the connector 43. The screw therefore has a portion which protrudes from the surface 46. It can be rotated about its axis by a toothed wheel 54 which engages on the thread of an endless screw 55. The screw 51 has an axial opening in which is fixed a valve 56 of the same type as the valves 14 and 24 illustrated in FIG. 1.

A component 50, shown in FIG. 2 connected to the component 40, includes a sheath 57 whose outside diameter is equal to that of the sheath 41. The sheath 57 is connected to a sleeve 58 whose outside diameter is equal to that of the sheath 57. A cylindrical connector 59 provided with sockets 60 is fixed inside the sleeve 58. The connector has a plane inner surface 61 and a plane outer surface 62 facing the surface 46 of the connector 43, the sockets opening out onto the surface 62. A sleeve 63, fixed coaxially inside the sleeve 58, passes through the connector 59 from the surface 61 to the surface 62. The sleeve 63 has an inner tapping in which the thread of the screw 51 can be screwed. A valve 64, of the same type as the above-mentioned valves, is coaxially fixed to the inside end of the sleeve 63.

Two towing cables, not shown, can be fixed in the sleeves 72 and 73 which are respectively integral with the sleeves 47 and 63 of the components 40 and 50.

To connect the components 40 and 50 together, their end pieces are brought closer together so as to engage the thread of the screw 51 in the tapping of the sleeve 63 and the endless screw 55 is turned with a screw driver so as to insert the protruding part of the screw 51 in the sleeve 63 by rotating the screw about its axis. The two end pieces are therefore progressively brought closer together. The insertion of the pins into the sockets can be guided by means of a spline of the sleeve 58 which engages in a key-way such as 71 of the sleeve 42. When the protruding portion of the screw 51 is driven into the sleeve 63, the components 40 and 50 are connected together, the sleeve 42 and 58 being in contact with each other via an O ring 65. The ends 66 of the valves 56 and 64 are then in mutual contact. These valves are therefore open and part of the dielectric liquid contained in the components 40 and 50 flows out through the end 66 into the surrounding space 67 and is channeled at the output of the space 67 by a longitudinal groove 68 formed on the cylindrical outer surface of the screw 51. Since in the device illustrated in FIG. 1, the liquid fills the small space between the facing surfaces 46 and 62 of the connectors 43 and 59. It then fills a space 69 between the sleeves 42 and 58 to reach the seal ring 65. During the connection of the components, a bleed screw 70 in the wall of the sleeve 42 which faces the space 69 allows removal of the air which fills the spaces 67, 69 and the space between the surfaces 46 and 62. FIG. 2 shows that in the case of FIG. 1, the outer surface of the two components is cylindrical and continuous.

Figure 3:
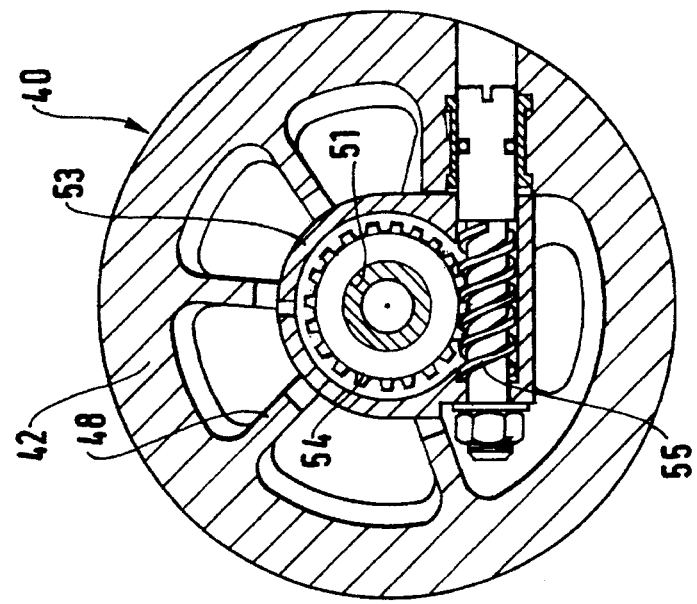
FIG. 3 is a transversal cross-section of the device illustrated in FIG. 2.

FIG. 3, which is a transverse cross-section of the device along a plane III—III shown in FIG. 2 shows more clearly the endless screw 55 co-operating with the toothed wheel 54 with a view to turning the screw 51 about its axis.

In a variant of the device in accordance with the invention, only one of the end pieces to be connected has a valve, the other end piece being sealed. In this case, the valve is opened by pressing its end on a hard portion of the opposite end piece.

We claim:

1. A device for picking up sound waves propagating in water, the device including at least a first component and a second component, each component including at least one acoustic sensor disposed inside a cylindrical sheath, electric conductors disposed in the sheath and connected to the sensor, two cylindrical end pieces connected coaxially to the two respective ends of the sheath in a sealed manner and a dielectric liquid disposed inside the sheath between the two end pieces, a first end piece of the first component including a first cylindrical electric connector fixed coaxially in the first end piece, the connector having a first plane outer surface and being in contact with the dielectric liquid of the first component which is on the side opposite to the first surface, the first connection including connector pins which protrude with respect to the first surface and which are connected, on the opposite site side, to the conductors disposed in the sheath of the first component, a second end piece of the second component comprising a second cylindrical electric connector fixed coaxially in the second end piece, said connector having a second outer surface and being in contact with the dielectric liquid of the second component on the opposite side to the second surface, the second connector including sockets which lead out onto the second surface and are connected, on the opposite side, to the conductors disposed in the sheath of the second component, the device further including means for connecting the first component to the second component by inserting pins in the sockets and applying the first end piece against the second end piece, the means including at least one seal ring for preventing the water from reaching the space between the first surface and the second surface when the device is submerged, characterized in that it further includes at least a first valve fixed axially in the first connector and means for causing the first valve to open when the first end piece is in contact with the second end piece, so that part of the dielectric liquid inside the sheath of the first component can flow through the first valve into the space between the first surface and the second surface up to the seal ring, said part of the liquid then exerting on the seal ring a pressure which opposes that exerted on the seal ring by the water in which the device is submerged.

2. A device according to claim 1, characterized in that the means for causing the first valve to open include a valve pin disposed at the outer end of the valve, the pin being actuated by applying against a portion of the second end piece when the first end piece is in contact with the second end piece.

3. A device according to claim 2, characterized in that it further includes a second valve fixed axially in the second connector, the second valve including a valve pin disposed at the outer end of the valve, the pin being actuated by applying the first valve against the pin thereof when the first end piece comes into contact with the second end piece, this opening the first valve and the second valve simultaneously.

4. A device according to claim 3, characterized in that said connecting means include a screw disposed axially in a sealed manner in the first connector and having a portion which protrudes with respect to the first surface, the screw being fixed axially and being capable of rotating about its axis, the screw including an axial opening in which are fixed: the first valve; a sleeve fixed axially in a sealed manner inside the second connector, the sleeve crossing through the second connector and its cylindrical inner surface being tapped so that it can engage in the thread of the screw, the second valve being fixed coaxially to the inside end of the sleeve; and means for making the screw rotate about its axis so as to make its protruding portion enter the sleeve by the rotation of said thread in said tapping, the screw being provided with a longitudinal groove so that the part of the liquid which leaves the first valve and the second valve can reach the space between the first surface and the second surface by flowing in the groove.

5. A device according to claim 1, characterized in that said means for connecting the first component to the second component include a coupling ring disposed coaxially, after connection, between the sheath of the first component and that of the second component, the outer diameters of the ring and of the sheaths being identical so that the outer surface of the first and second components which are connected together form a continuous cylindrical surface with a substantially constant diameter.

6. A device according to claim 4, characterized in that the outside diameters of the first and second end pieces, as well as the outside diameters of the sheaths of the first and second components are identical so that the outer surfaces of the first and second components connected together form a continuous cylindrical surface with a substantially constant diameter.

7. A device according to claim 1, characterized in that it includes bleed means for removing the air trapped by the seal ring in the space between the first and second end pieces during connection.

* * * * *